US011036562B2

(12) United States Patent
Feng et al.

(10) Patent No.: US 11,036,562 B2
(45) Date of Patent: Jun. 15, 2021

(54) STREAMING DATA DISTRIBUTED PROCESSING METHOD AND DEVICE

(71) Applicant: ADVANCED NEW TECHNOLOGIES CO., LTD., Grand Cayman (KY)

(72) Inventors: Chenglin Feng, Hangzhou (CN); Liang Luo, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 85 days.

(21) Appl. No.: 16/195,223

(22) Filed: Nov. 19, 2018

(65) Prior Publication Data

US 2019/0114213 A1    Apr. 18, 2019

Related U.S. Application Data

(63) Continuation of application No. PCT/CN2017/087380, filed on Jun. 7, 2017.

(30) Foreign Application Priority Data

Jun. 20, 2016    (CN) .......................... 201610447125.8

(51) Int. Cl.
*G06F 9/46*         (2006.01)
*G06F 9/52*         (2006.01)
(Continued)

(52) U.S. Cl.
CPC .............. *G06F 9/52* (2013.01); *G06F 9/5083* (2013.01); *G06F 16/00* (2019.01); *G06F 16/24568* (2019.01)

(58) Field of Classification Search
CPC ....... G06F 9/52; G06F 16/24568; G06F 16/00
See application file for complete search history.

(56) References Cited

U.S. PATENT DOCUMENTS 6,055,619 A    4/2000    North et al.
6,633,825 B2   10/2003   Burns et al.
(Continued)

FOREIGN PATENT DOCUMENTS

CN    101167357 B    9/2011
CN    103458000 A    12/2013
(Continued)

OTHER PUBLICATIONS

Office Action for Korean Application No. 10-2019-7001861 dated Jan. 17, 2020 (9 pages).
(Continued)

*Primary Examiner* — Camquy Truong

(57) ABSTRACT

A method comprises: obtaining service data identifier information of a data record of streaming data, a to-be-processed real-time value of the data record, and a time sequence characteristic of the to-be-processed real-time value of the data record, the identifier information representing service data; obtaining a time sequence characteristic of a processed real-time value of the service data based on a correspondence relationship between the service data identifier information and the time sequence characteristic of the processed real-time value; and comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value.

17 Claims, 4 Drawing Sheets

(51) Int. Cl.
  *G06F 16/00* (2019.01)
  *G06F 16/2455* (2019.01)
  *G06F 9/50* (2006.01)

(56) References Cited

U.S. PATENT DOCUMENTS

| | | |
|---|---|---|
| 6,748,440 B1 | 6/2004 | Lisitsa et al. |
| 6,779,155 B1 | 8/2004 | Bahrs et al. |
| 6,910,078 B1 | 6/2005 | Raman et al. |
| 7,007,096 B1 | 2/2006 | Lisitsa et al. |
| 7,051,245 B2 | 5/2006 | Brown et al. |
| 7,529,752 B2 | 5/2009 | Hinshaw et al. |
| 7,657,861 B2 | 2/2010 | Vorbach et al. |
| 7,849,227 B2 | 12/2010 | Kashiyama et al. |
| 8,595,596 B2 | 11/2013 | Grube et al. |
| 8,639,625 B1 | 1/2014 | Ginter et al. |
| 8,904,181 B1 | 12/2014 | Felsher et al. |
| 10,515,061 B2 * | 12/2019 | Bain .................... G06F 16/285 |
| 2003/0004661 A1 * | 1/2003 | Burns .................... G01R 35/04 702/61 |
| 2003/0140051 A1 | 7/2003 | Fujiwara et al. |
| 2007/0041399 A1 | 2/2007 | Wendling et al. |
| 2007/0226226 A1 | 9/2007 | Mintz |
| 2008/0273698 A1 | 11/2008 | Manders et al. |
| 2009/0271529 A1 | 10/2009 | Kashiyama et al. |
| 2010/0106853 A1 | 4/2010 | Kashiyama et al. |
| 2010/0106946 A1 | 4/2010 | Imaki et al. |
| 2010/0195974 A1 | 8/2010 | Zheng et al. |
| 2013/0139165 A1 | 5/2013 | Doukhvalov et al. |
| 2015/0212844 A1 * | 7/2015 | Tsirkin ................ G06F 9/45558 718/1 |
| 2016/0026673 A1 | 1/2016 | Sun et al. |
| 2016/0098469 A1 | 4/2016 | Allinson et al. |
| 2017/0039638 A1 * | 2/2017 | Lane .................... G06F 16/248 |

FOREIGN PATENT DOCUMENTS

| | | |
|---|---|---|
| CN | 104091276 A | 10/2014 |
| CN | 104320382 A | 1/2015 |
| CN | 104794114 A | 7/2015 |
| CN | 104866234 A | 8/2015 |
| EP | 0436092 A2 | 7/1991 |
| EP | 1611749 B1 | 1/2012 |
| JP | 2003-216474 A | 7/2003 |
| KR | 10-2008-0096004 A | 10/2008 |
| KR | 10-1410621 B1 | 6/2014 |
| KR | 20150123603 A | 11/2015 |
| KR | 10-1588375 B1 | 1/2016 |
| RU | 2494453 C2 | 9/2013 |
| RU | 2584471 C1 | 5/2016 |
| WO | WO-2015103615 A1 * | 7/2015 ......... G06F 19/3418 |
| WO | 2015/183517 A1 | 12/2015 |

OTHER PUBLICATIONS

Office Action for Japanese Application No. 2018-566484 dated Jan. 21, 2020 (8 pages).
Search Report for European Application No. 17814596.7 dated Dec. 17, 2019 (9 pages).
Bouali et al., "Out-Of-Order Events Processing," Internet of Things and Cloud Computing, Mar. 22, 2016 (4 pages).
Hirzel et al., "Spreadsheets for stream processing with unbounded windows and partitions," Distributed and Event-based systems, ACM, Jun. 13, 2016 (12 pages).
Akidau et al., "The dataflow model," Proceedings of the VLDB Endowment, Accosiation of Computing Machinery, Aug. 1, 2015 (12 pages).
First Search for Chinese Application No. 201610447125.8 dated Sep. 4, 2019 (1 page).
First Office Action for Chinese Application No. 201610447125.8 dated Oct. 9, 2019 with English machine translation (17 pages).
Official Decision of Grant and Search Report for Russian Patent Application No. 2019101005 dated Aug. 28, 2019 (22 pages).
Written Opinion of the International Searching Authority and International Search Report for PCT Application No. PCT/CN2017/087380 dated Sep. 11, 2017 (12 pages).
International Preliminary Report on Patentability for PCT Application No. PCT/CN2017/087380 dated Jan. 3, 2019 (9 pages).
Decision to grant a patent for Taiwanese Application No. 106112250 dated Feb. 23, 2019 (3 pages).
First Examination Report for Australian Patent Application No. 2017282818 dated Jun. 14, 2019 (2 pages).
Office Action for Canadian Patent Application No. 3025215 dated Jun. 25, 2019 (3 pages).
Office Action for European Application No. 17814596.7, dated Sep. 21, 2020, 7 pages.
First Examination Report for Indian Application No. 201947000938 dated Apr. 22, 2021.

* cited by examiner

STREAMING DATA DISTRIBUTED PROCESSING METHOD AND DEVICE

CROSS REFERENCE TO RELATED APPLICATIONS

The present application is a continuation application of the International Patent Application No. PCT/CN2017/087380, filed on Jun. 7, 2017, and titled "STREAMING DATA DISTRIBUTED PROCESSING METHOD AND DEVICE," which claims priority to Chinese Patent Application No. 201610447125.8 filed on Jun. 20, 2016 and entitled "STREAMING DATA DISTRIBUTED PROCESSING METHOD AND DEVICE." The entire contents of all of the above applications are incorporated herein by reference in their entirety.

TECHNICAL FIELD

This invention relates to the technical field of data processing, and in particular, to a streaming data distributed processing method and apparatus.

BACKGROUND

As various network applications become more and more deeply entrenched in people's daily lives, many application systems generate service data in the terabytes every day. The real-time analysis of this sea of data can provide information that is of great value to application systems. For example, the real-time analysis of video data streams collected by traffic monitoring systems can help with directing traffic flow, and the real-time analysis of user access behavior on social networking sites can promptly uncover hot topics and push to more users.

Vast amounts of real-time service data are typically saved in different locations, on different software and hardware platforms, and/or in different types of databases. A real-time data collection system continuously collects real-time changing service data in a database in the form of a stream, to perform real-time data processing. A real-time data collection system can be achieved using a single thread, or be achieved employing a distributed form, with multiple threads concurrently performing real-time data collection.

Since the service data of an application system may be updated at any time, especially that a single piece of service data possibly may be updated multiple times within a very short period of time, a real-time data collection system implemented using a single thread can ensure that the service data real-time value that was updated first comes before the later-updated service data real-time value in the streaming data. However, in the vast majority of situations, the low performance of single threads cannot meet real-time data processing demands for large amounts of data. In a distributed real-time data collection system, it is possible that the sequence of service data real-time values in its generated distributed streaming data differs from the sequence in which the updates occur.

In current technologies, data processing of service data real-time values is performed in accordance with the sequence of the service data in the streaming data. By this way, when the sequence of service data real-time values in the distributed streaming data differs from the sequence in which the updates occur, earlier updated real-time values will replace later-updated real-time values, leading to errors in the data processing results.

SUMMARY

According to one aspect, a streaming data distributed processing method comprises: obtaining service data identifier information of a data record of streaming data, a to-be-processed real-time value of the data record, and a time sequence characteristic of the to-be-processed real-time value of the data record, the identifier information representing service data; obtaining a time sequence characteristic of a processed real-time value of the service data based on a correspondence relationship between the service data identifier information and the time sequence characteristic of the processed real-time value; and comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value.

According to another aspect, a streaming data distributed processing apparatus comprises: a processor and a non-transitory computer-readable storage medium coupled to the processor, the storage mediums storing instructions that, when executed by the processor, cause the apparatus to perform: obtaining service data identifier information of a data record of streaming data, a to-be-processed real-time value of the data record, and a time sequence characteristic of the to-be-processed real-time value of the data record, the identifier information representing service data; obtaining a time sequence characteristic of a processed real-time value of the service data based on a correspondence relationship between the service data identifier information and the time sequence characteristic of the processed real-time value; and comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value.

According to another aspect, a non-transitory computer-readable storage medium storing instructions that, when executed by a processor, cause the processor to perform: obtaining service data identifier information of a data record of streaming data, a to-be-processed real-time value of the data record, and a time sequence characteristic of the to-be-processed real-time value of the data record, the identifier information representing service data; obtaining a time sequence characteristic of a processed real-time value of the service data based on a correspondence relationship between the service data identifier information and the time sequence characteristic of the processed real-time value; and comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value.

As shown by the above technical solutions, in the embodiments of this disclosure, the time sequence characteristic of the processed real-time value of the data record is saved during data processing and compared to the time sequence characteristic of the to-be-processed real-time value from the same data record in the streaming data, and the to-be-processed real-time value with a time sequence later than the processed real-time value undergoes service computations. Thus, data processing according to the data update sequence is achieved, preventing processing result errors caused by processing a real-time value that was updated later, and enhancing data processing accuracy.

DETAILED DESCRIPTION

Streaming data distributed processing methods and systems are disclosed. The streaming data includes time sequence characteristic of to-be-processed real-time values of data records, and time sequence characteristic of processed real-time values for data records that have already undergone data processing is saved. By comparing the time sequence characteristics of the to-be-processed and processed real-time values, the relative time sequence of to-be-processed and processed real-time values is found, and when the time sequence of the to-be-processed real-time value is later, the time sequence of the to-be-processed real-time value undergoes data processing. In this way, it is possible to prevent data processing result errors caused by the later processing of real-time values with earlier time sequences, thus overcoming a problem in the existing technology.

Figure 1:
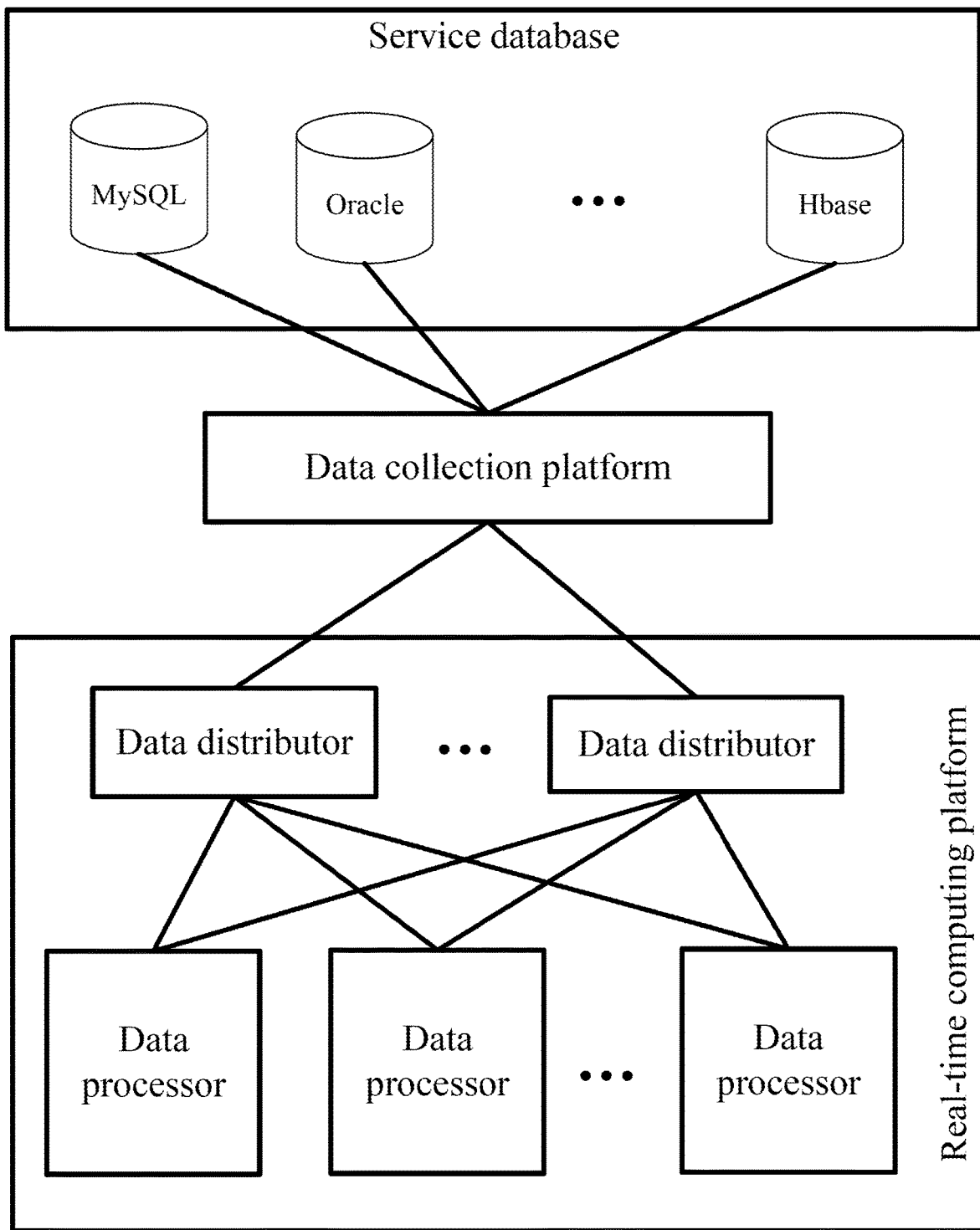
FIG. 1 is a network structure diagram for an application scenario, according to various embodiments of the present disclosure.

An exemplary network structure of an application scenario is shown in FIG. 1. In some embodiments, the service data generated and refreshed by different service systems during the operational running process may be stored in a number of different types (e.g., MySQL, Oracle, HBase, etc.) of service databases. When service data meeting predetermined conditions is added to or refreshed in a service database, a data collection platform generates a data record based on the newly added or updated service data, combines the constantly generated data records as streaming data, and provides the streaming data to a real-time computing platform. The data collection platform can be achieved by employing message-oriented middleware (e.g., kafka, Time-Tunel, etc.), writing the generated data record as a message into a message queue to provide to a real-time computing platform for reading. The real-time computing platform can employ distributed computing (e.g., Jstorm, storm, etc.), and can also employ centralized computing. FIG. 1 may be a framework when distributed computing is employed. One or more data distributors (e.g., the spouts of the storm platform) distribute data records of streaming data to at least two data processors (e.g., the bolts of the storm platform), and the data processor causes real-time changes in the service data to be reflected in the processing results.

As such, in FIG. 1, if a data collection platform employs multi-thread parallel acquisition, and/or a real-time computing platform employs distributed computing, when a piece of service data is continuously updated, a data record carrying a service data real-time value that was updated earlier may arrive at the real-time computing platform's data processor later than a data record carrying a service data real-time value that was updated later. The embodiments of this disclosure may run on a real-time computing platform (run on each data processor when distributed computing is employed), and can prevent errors that the processing results of later updated service data are covered up by the processing results of the earlier updated service data in the aforementioned situation.

The embodiments of this disclosure can be applied to any physical or logical device with computing and storage capabilities, e.g., mobile phones, tablet computers, PCs (personal computers), laptops, servers, and virtual machines. The device can alternatively be two or more physical or logical devices sharing different duties, coordinating with each other to achieve the various functions in the embodiments of this disclosure.

Figure 2:
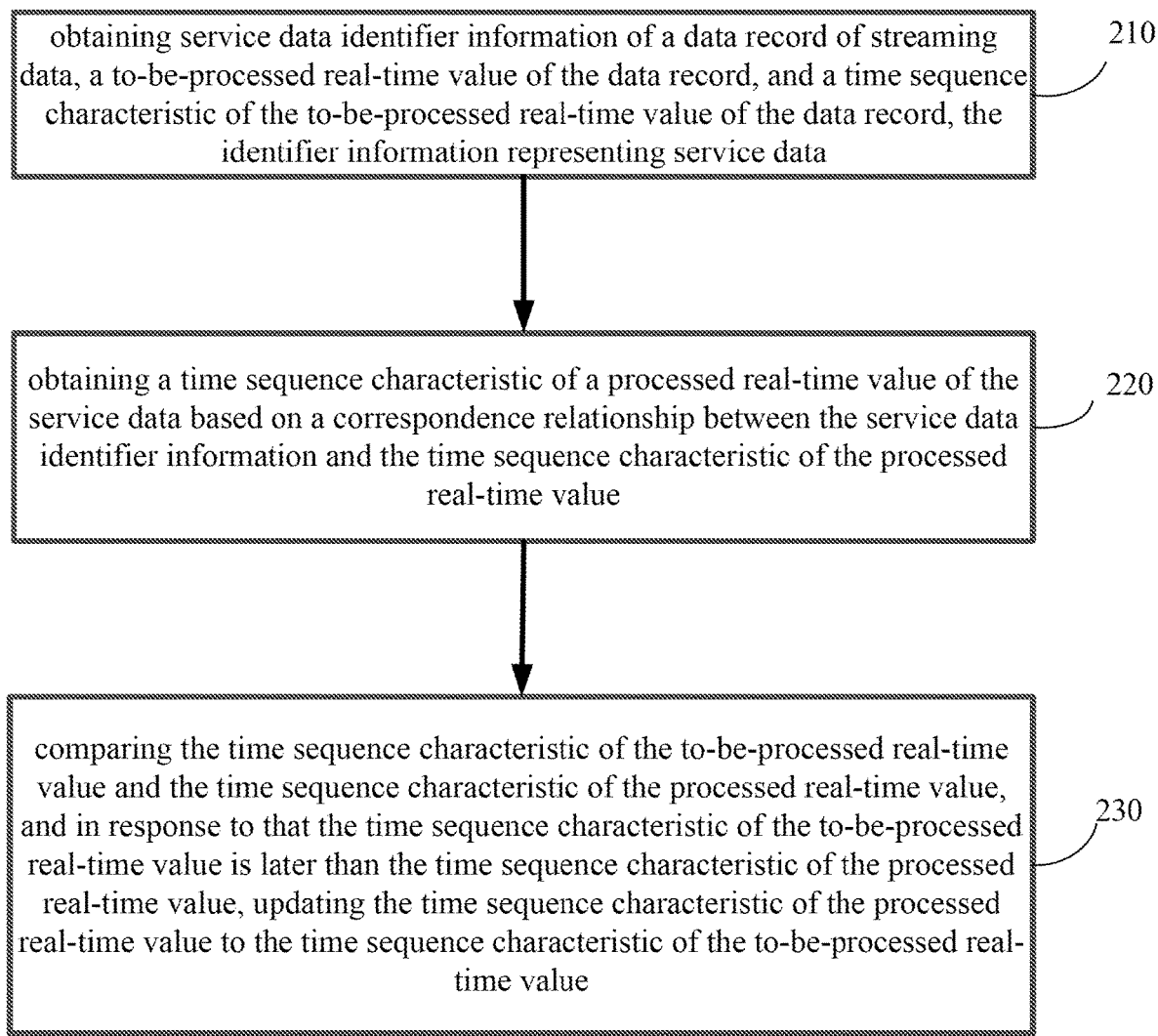
FIG. 2 a flow diagram of a streaming data distributed processing method, according to various embodiments of the present disclosure.

In some embodiments, the flow of the streaming data distributed processing method is as shown in FIG. 2.

Step 210 comprises obtaining service data identifier information of a data record of streaming data, a to-be-processed real-time value of the data record, and a time sequence characteristic of the to-be-processed real-time value of the data record, the identifier information representing service data.

In some embodiments, a data record is the smallest constituent unit of streaming data. Each data record is generated based on the change (addition or update) of a piece of service data (e.g., account balance) or the simultaneous change of a set (two or more pieces) of service data (e.g., the number of transfers, the total amount transferred out) in the service database. A data record comprises the identifier information of the service data or the set of service data and the real-time value of the service data or the set of service data; usually, the data record also comprises the time at which the real-time value was generated in the service database.

In some embodiments, the identifier information uniquely represents the service data or the set of service data. For example, there is a one-to-one correspondence between the identifier information and the service data or the set of service data. For example, an embodiment of this disclosure may run on each data processor of a real-time computing platform, so for each data record processed by a data processor, there is a one-to-one correspondence between the identifier information and a piece of service data or a set of service data. In an actual application scenario, the field and table identifiers in a service database and/or service data identifiers in a service system may be referenced in order to determine the identifier information of service data. For example, a combination of the primary key, table name, and database name of the table in which the service data is located may be used as the service data's identifier information. Also, the main service primary key identifier of the service to which the service data belongs, the secondary service primary key identifier, and the application signature may be used as the service data's identifier information.

The real-time value of the service data is the value of the service data or the set of service data after the most recent change. The real-time value generation time is the time at which the service data changes in the service database.

A time sequence characteristic of real-time value comprises information associated with the time at which the service data or the set of service data changed. When the service data or the set of service data experiences N number of changes, N data records will be generated. In these N data records, the service data identifier information is the same, the service data real-time values are different, and in the vast majority of situations, the time sequence characteristics of the real-time values are also different. By comparing the time sequence characteristics of the real-time values, it may be possible to learn which real-time value or values of this service data or the set of service data occurred earlier, and which occurred later.

Variables that are used as the time sequence characteristic of the real-time values can be selected based on factors in an actual application scenario such as the speed at which service data changes and precision requirements for streaming data processing. For example, the real-time value generation time in a data record may be used as a time sequence characteristic of the real-time value. For service data having identical identifier information, the time sequence of the real-time value can be determined based on the real-time value generation time. However, because saving real-time value generation times is usually limited by the precision (e.g., to the millisecond), two changes to the same piece or the same set of service data taking place extremely close together (e.g., within tens of microseconds) may have the same real-time value generation time.

In addition to increasing the precision of real-time value generation times, in application scenarios with message-oriented middleware serving as the data collection platform, it is also possible to use the real-time value generation time and the message identifier of the message containing the real-time value as time sequence characteristic of the real-time value. In this type of application scenario, the message-oriented middleware packages one or more data records in a message, a message identifier is designated for each message in accordance with the time sequence of message generation, and the messages carrying message identifiers make up a message flow (i.e., streaming data). Because the data records generated for two consecutive changes to the same piece or the same set of service data usually will not appear in the same message, a message identifier reflecting the message generation time sequence also reflects the time information of the service data's real-time value. For two data records with the same service data identifier information, if the real-time value generation times of the service data are different, the time sequence of the real-time values is determined based on the real-time value generation times. If the real-time value generation times of the service data are the same, the time sequence of the real-time values can be determined based on the message identifiers of the messages containing the data records.

As such, a data record is extracted from streaming data, and from the data record, it is possible to obtain service data identifier information and the to-be-processed real-time value of the service data (because the real-time value of the service data in the data record has not undergone data processing, the real-time value of the service data in the data record may be referred to as the to-be-processed real-time value), and the time sequence characteristic of the to-be-processed real-time value can be obtained from the data record or from the data record and the message carrying the data record.

Step 220 comprises obtaining a time sequence characteristic of a processed real-time value of the service data based on a correspondence relationship between the service data identifier information and the time sequence characteristic of the processed real-time value.

Step 230 comprises comparing the time sequence characteristic of the to-be-processed real-time value and the time sequence characteristic of the processed real-time value, and in response to that the time sequence characteristic (e.g., time sequence) of the to-be-processed real-time value is later than the time sequence characteristic (e.g., time sequence) of the processed real-time value, updating the time sequence characteristic of the processed real-time value to the time sequence characteristic of the to-be-processed real-time value.

In some embodiments, a table of correspondence relationships between service data identifier information and time sequence characteristic of processed real-time value is maintained, wherein the time sequence characteristic of a processed real-time value is the time sequence characteristic of the service data real-time value that most recently underwent data processing. The data record containing this real-time value is placed ahead of the original data record in the streaming data.

After obtaining service data identifier information from a new data record, the table of correspondence relationships between identifier information and time sequence characteristic of processed real-time values is consulted. If this identifier information is present, the time sequence characteristic of the processed real-time value of the service data with this identifier information can be obtained. The time sequence characteristics of the to-be-processed and processed real-time values of this service data are compared. If the time sequence of the to-be-processed real-time value is later than the processed real-time value, the to-be-processed real-time value is employed in service computations (i.e., the to-be-processed real-time value undergoes data processing), and in the table of correspondence relationships between identifier information and time sequence characteristic of processed real-time values, the time sequence characteristic of the processed real-time value corresponding to the identifier information in the data record is updated as the time sequence characteristic value of the to-be-processed real-time value of the data record. Otherwise, the to-be-processed real-time value in the data record does not undergo processing, i.e., the to-be-processed real-time value in the data record is not used in service computations, to avoid having a real-time value that was updated earlier replacing a real-time value that was updated later, which leads to errors in the data processing results.

For a situation in which the real-time value generation time serves as the time sequence characteristic of the real-time value, when the to-be-processed real-time value generation time is greater than the processed real-time value generation time, the time sequence of the to-be-processed real-time value is later than the time sequence of the processed real-time value. For a situation in which the real-time value generation time and the message identifier of the message containing the real-time value are used as the time sequence characteristic of the real-time value, when the to-be-processed real-time value generation time is later than the processed real-time value generation time, and when the generation times of the to-be-processed and processed real-time values are the same, with the time sequence reflected by the message identifier of the message containing the to-be-processed real-time value being later than the time sequence reflected by the message identifier of the message containing the processed real-time value, the time sequence of the to-be-processed real-time value is later than the time sequence of the processed real-time value.

If the table of correspondence relationships between identifier information and time sequence characteristic of processed real-time values does not have a time sequence characteristic of processed real-time value corresponding to the service data identifier information in the data record, this may be the first time receiving a real-time value for this service data or this set of service data. Therefore, the to-be-processed real-time value of the service data in the data record is used in service computations, the time sequence characteristic of the service data's to-be-processed real-time value serves as the time sequence characteristic of the processed real-time value, and the correspondence relationship between the service data's identifier information and the time sequence characteristic of the processed real-time value is saved in the correspondence relationship table.

The specific algorithm for employing the to-be-processed real-time value to conduct service computations can be based on the demands of the actual application scenario.

In application scenarios involving identifier information with high byte numbers or numerous table items in the table of correspondence relationships between identifier information and time sequence characteristic of processed real-time values, looking up the correspondence relationship table can require a considerable amount of time. To reduce the impact of look-up times on the real-time quality of data processing, the identifier information can be made to comprise an identifier characteristic and at least one identifier field, wherein the combination of all identifier fields uniquely represents one piece or one set of service data; the input of the identifier characteristic is a predetermined portion of the combination of all identifier fields, and is generated using an algorithm (e.g., a digest algorithm). When looking up the correspondence relationship table, the identifier characteristic in the identifier information can be used as an index to perform a table item look-up, thereby accelerating look-up speeds.

In an application scenario in which the real-time computing platform employs distributed computing, the disclosed method runs in parallel and independently on two or more software function modules responsible for data processing (e.g., the data processors in the network structure shown in FIG. 1). Prior to the streaming data arriving at these software function modules, data distributors will usually distribute the different data records to these software function modules. The data distributors can distribute the data records to software function modules according to all or a predetermined portion of the service data identifier information in the data records, so data records with the same service data identifier information can be distributed to the same software function module. This way, the table of correspondence relationships between identifier information and time sequence characteristic of processed real-time values can be implemented on a single software function module, and not on the overall real-time computing platform, thereby reducing the capacity of the correspondence relationship table and accelerating look-up speeds.

As such, in the embodiments of this disclosure, the streaming data carries the time sequence characteristic of the to-be-processed real-time values of data records. During data processing, the time sequence characteristic of the data record's processed real-time value is saved, and by comparing the time sequence characteristics of the to-be-processed and processed real-time values, only a to-be-processed real-time value with a time sequence later than the processed real-time value undergoes service computations, avoiding processing result errors caused by processing a real-time value that was updated later, and boosting data processing accuracy.

In one application example of this disclosure, message-oriented middleware collects service data that has been changed from a service database and generates data records. The data records comprise service data identifier information, service data real-time values (to-be-processed real-time values), and real-time value generation times. Here, the service data identifier information comprises an identifier characteristic and at least two identifier fields, and the identifier fields are one or more service primary key identifiers and a service signature. There is a one-to-one correspondence between the combination of these service primary key identifiers and the service signature and the service data used to generate the data record (within the scope of the software function module processing the data record). The service primary key identifier comprises a main service primary key identifier. If there is more than one service primary key identifier, the service primary key identifier can also comprise a secondary service primary key identifier and other service primary key identifiers. The identifier characteristic is the first several bits of the digest value of the main service primary key, wherein the digest value is a value obtained from the main service primary key after employing a digest algorithm. For example, the first 5 bits of the main service primary key's MD5 (Message Digest Algorithm 5) value can be used as the identifier characteristic. The identifier characteristic is joined up with all identifier fields (a fixed symbol can be used in between neighboring identifier fields as a join operator, such as "#") to serve as the service data's identifier information. Exemplary results are shown in Table 1.

TABLE 1

| Identifier characteristic | Identifier field | | | |
|---|---|---|---|---|
| First 5 bits of MD5 value of main service primary key identifier | Main service primary key identifier | Secondary service primary key identifier | Other service primary key identifier | Service signature |
| | | Joined using "#" | | |

The message-oriented middleware packages a data record in a message, the next message serial number sorted in ascending order is used as the message identifier (similarly packaged in the message), and the generated message is placed in the message queue.

A data distributor of the real-time computing platform extracts a message from the message queue, parses the data record, and sends the data record and the message identifier of the message containing the data record to one of the data processors according to the identifier characteristic of the service data identifier information in the data record. Because the identifier characteristic is the first several bits of the main service primary key's digest value, data records with service data bearing the same main service primary key will be distributed to the same data processor. In other words, the same service data will undergo data processing on the same data processor.

Each data processor keeps a table of correspondence relationships between service data identifier information and time sequence characteristic of processed real-time values: DATA_CHECK. The fields of the DATA_CHECK table are as shown in Table 2:

TABLE 2

| Field name | Field type | Field description | Notes |
|---|---|---|---|
| ROWKEY | STRING | primary key | identifier characteristic + identifier field |
| LAST_VERSION | STRING | time sequence characteristic of processed real-time value | real-time value generation time + message identifier of message where located |

After receiving a data record and the message identifier of the message in which the data record is located that are distributed by a data distributor, the data processor extracts service data identifier information from the data record, uses the data record's service data real-time value and real-time value generation time as the to-be-processed real-time value and to-be-processed real-time value generation time, and uses the distributed message identifier as the message identifier of the message in which the to-be-processed real-time value is located.

Using the identifier characteristic in the identifier information as an index, the data processor looks up ROWKEY in the DATA_CHECK table as the table item for this identifier information, obtains the LAST_VERSION of the time sequence characteristic of the processed real-time value corresponding to the identifier information, and parses the processed real-time value generation time and the message identifier of the message in which the processed real-time value is located.

The data processor compares the to-be-processed and processed real-time value generation times. If the to-be-processed real-time value generation time is later than the processed real-time value generation time, or if the to-be-processed and processed real-time value generation times are the same and the message identifier of the message in which the to-be-processed real-time value is located is greater than the message identifier of the message in which the processed real-time value is located, the to-be-processed real-time value undergoes data processing, and the LAST_VERSION of the table item with this identifier information in the DATA_CHECK table is changed to the to-be-processed real-time value generation time and the message identifier of the message holding the to-be-processed real-time value. Otherwise, the data record's to-be-processed real-time value is abandoned and does not undergo data processing.

Figure 3:
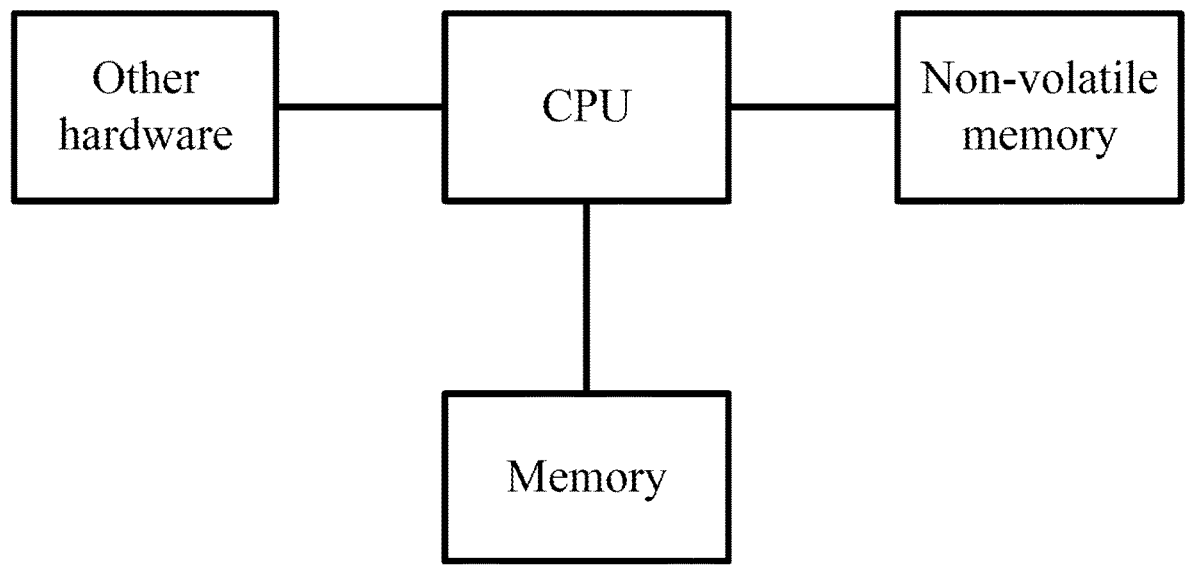
FIG. 3 is a hardware structure diagram of a streaming data distributed processing device, according to various embodiments of the present disclosure.

Corresponding to the implementation of the processes described above, the embodiments of this disclosure also provide an apparatus for streaming data distributed processing. This apparatus can be implemented through software, through hardware or a combination of software and hardware. Using software implementation as an example, as a logical apparatus, the apparatus is run by having the CPU (Central Processing Unit) of the device in which the CPU is located to read corresponding computer program instructions to memory. As for hardware, in addition to the CPU, memory, and non-volatile memory shown in FIG. 3, the device in which the apparatus for streaming data distributed processing is located may also comprise other hardware such as a chip used to perform wireless signal transmission and reception, and/or other hardware such as a card used for network communications.

Figure 4:
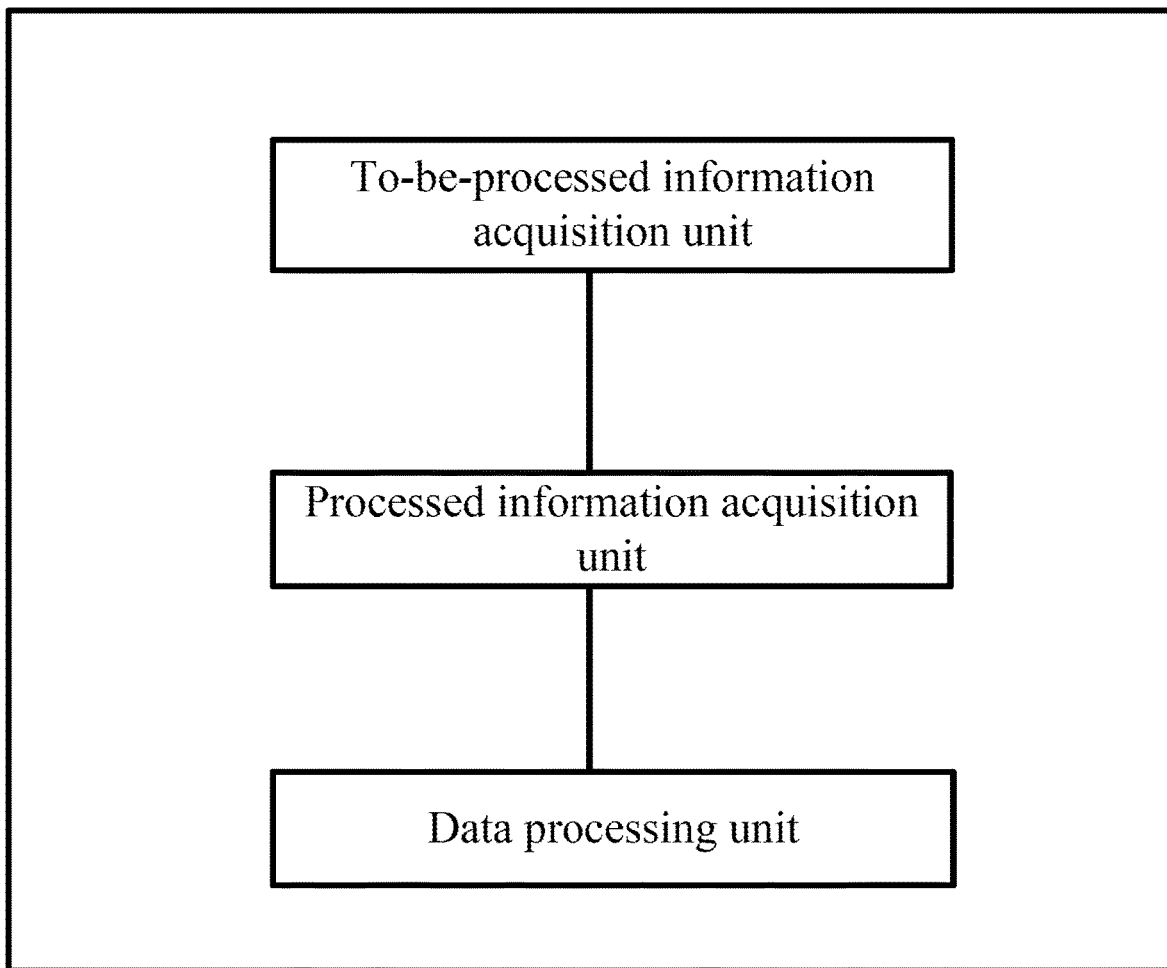
FIG. 4 is a logic structure diagram of a streaming data distributed processing apparatus, according to various embodiments of the present disclosure.

FIG. 4 shows the streaming data distributed processing apparatus provided by the embodiments of this disclosure, comprising a to-be-processed information acquisition unit, a processed information acquisition unit, and a data processing unit, wherein: the to-be-processed information acquisition unit is configured to obtain service data identifier information of a data record of streaming data, a to-be-processed real-time value of the data record, and a time sequence characteristic of the to-be-processed real-time value of the data record, the identifier information representing service data; the processed information acquisition unit is configured to obtain a time sequence characteristic of a processed real-time value of the service data based on a correspondence relationship between the service data identifier information and the time sequence characteristic of the processed real-time value; and the data processing unit is configured to compare the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value.

Optionally, the time sequence characteristic comprises: the real-time value generation time.

Optionally, the streaming data comprises: a flow of messages carrying the service data identifier information, the to-be-processed real-time value, and the time sequence characteristic of the to-be-processed real-time value; the time sequence characteristic of the real-time value comprises: a real-time value generation time and a message identifier of a message containing the real-time value, the message identifier reflecting a time sequence of message generation; and the time sequence of the to-be-processed real-time value being later than the time sequence of the processed real-time value comprises: the to-be-processed real-time value's generation time being later than the processed real-time value's generation time, or the generation times of the to-be-processed and processed real-time values being the same and a time sequence reflected by a message identifier of a message containing the to-be-processed real-time value being later than a time sequence reflected by a message identifier of a message containing the processed real-time value.

Optionally, the apparatus also comprises: a processed information addition unit, configured to employ the to-be-processed real-time value of the service data in service computations before the time sequence characteristic of the processed real-time value of the service data has been stored; use the time sequence characteristic of the to-be-processed value of the service data as the time sequence characteristic of the processed real-time value; and save the correspondence relationship between the service data identifier information and the time sequence characteristic of the processed real-time value.

Optionally, the streaming data distributed processing method runs in parallel and independently on at least two software function modules, and the data record processed by the software function module is determined based on the service data identifier information or a part of the service data identifier information of the data record.

In one example, the identifier information comprises: an identifier characteristic and at least one identifier field; a combination of all identifier fields represents one piece or one set of the service data; and the identifier characteristic is generated based on a predetermined portion of the combination of all identifier fields.

In the preceding example, the identifier field may comprise: main service primary key identifier and application signature; and the identifier characteristic is first several bits of a digest value of the main service primary key identifier.

In some embodiments, the various modules and units of the streaming data distributed processing apparatus may be implemented as software instructions (or a combination of software and hardware). That is, the streaming data distributed processing apparatus described with reference to FIG. 4 may comprise a processor (e.g., the CPU) and a non-transitory computer-readable storage medium (e.g., the memory) storing instructions that, when executed by the processor, cause one or more components (e.g., the processor) of the streaming data distributed processing apparatus to perform various steps and methods of the modules and units described above. The streaming data distributed processing apparatus may also be referred to as a streaming data distributed processing system. In some embodiments, the streaming data distributed processing apparatus may include a mobile phone, a tablet computer, a PC, a laptop computer, a server, or another computing device.

The above merely describes some embodiments of this disclosure and does not limit this disclosure. All changes, equivalent substitutions, and improvements made within the spirit and principles of this disclosure shall fall within the scope of protection of this disclosure.

In one exemplary configuration, the computation device performing any of the disclosed steps comprises one or more processors (CPUs), input/output interfaces, network interfaces, and internal memory.

The internal memory may comprise the forms of volatile memory on computer-readable media, random access memory (RAM), and/or non-volatile RAM, such as read-only memory (ROM), or flash RAM. Internal memory is an example of computer-readable media.

Computer-readable media include permanent, nonpermanent, mobile, and immobile media, which can achieve information storage through any method or technology. The information may be computer-readable instructions, data structures, program modules, or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVD) or other optical memories, cassettes, magnetic tape and disk memories or other magnetic memory devices, or any other non-transmission media, which can be used for storing information that can be accessed by a computation device. According to the definitions herein, non-transitory computer-readable media may exclude transitory computer-readable media (transitory media), such as modulated data signals and carriers.

The terms "comprise" and "include" or any variations thereof are intended as non-exclusive inclusion. Thus, a process, method, product, or device comprising a series of elements may not only comprise these elements, but may also comprise other elements not explicitly listed, or elements inherent to that process, method, product, or device. When there are no other limitations, an element defined by the phrasing "comprising one . . . " does not exclude the presence of other similar elements in the process, method, product, or device comprising the element.

The embodiments of this disclosure can be provided as methods, systems, or computer program products. Therefore, this disclosure may employ a purely hardware embodiment form, purely software embodiment form, or an embodiment form that combines software and hardware. Also, this disclosure may employ the form of computer program products achieved through one or more computer storage media (including but not limited to magnetic disc memory, CD-ROM, and optical memory) comprising computer-executable program code.

The invention claimed is:

1. A streaming data distributed processing method, comprising: obtaining service data identifier information of a data record of streaming data, a to-be-processed real-time value of the data record, and a time sequence characteristic of the to-be-processed real-time value of the data record, the service data identifier information representing service data;
obtaining a time sequence characteristic of a processed real-time value of the service data based on a correspondence relationship between the service data identifier information and the time sequence characteristic of the processed real-time value;
comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value;
employing the to-be-processed real-time value of the service data in service computations before the time sequence characteristic of the processed real-time value of the service data has been stored;
using the time sequence characteristic of the to-be-processed value of the service data as the time sequence characteristic of the processed real-time value; and
saving the correspondence relationship between the service data identifier information and the time sequence characteristic of the processed real-time value, wherein:
the service data identifier information comprises: an identifier characteristic and at least one identifier field;
a combination of all identifier fields represents one piece or one set of the service data; and
the identifier characteristic is generated based on a predetermined portion of the combination of all identifier fields.

2. The method according to claim 1, wherein the time sequence characteristic comprises: a real time-value generation time.

3. The method according to claim 1, wherein:
the streaming data comprises: a flow of messages carrying the service data identifier information, the to-be-processed real-time value, and the time sequence characteristic of the to-be-processed real-time value;
the time sequence characteristic of the real-time value comprises: a real-time value generation time and a message identifier of a message containing the real-time value, the message identifier reflecting a time sequence of message generation; and
the time sequence of the to-be-processed real-time value being later than the time sequence of the processed real-time value comprises: the to-be-processed real-time value's generation time being later than the processed real-time value's generation time, or the generation times of the to-be processed and processed real-time values being the same and a time sequence reflected by a message identifier of a message containing the to-be-processed real-time value being later than a time sequence reflected by a message identifier of a message containing the processed real-time value.

4. The method according to claim 1, wherein the streaming data distributed processing method runs in parallel and independently on at least two software function modules.

5. The method according to claim 1, wherein:
the at least one identifier field comprises: a main service primary key identifier and an application signature; and
the identifier characteristic is first several bits of a digest value of the main service primary key identifier.

6. The method according to claim 1, further comprising:
in response to that the time sequence characteristic of the to-be-processed real-time value is not later than the time sequence characteristic of the processed real-time value, inhibiting the to-be-processed real-time value of the service date to be used in the service computations.

7. A streaming data distributed processing apparatus, comprising: a processor and a non-transitory computer-readable storage medium coupled to the processor, the storage medium storing instructions that, when executed by the processor, cause the apparatus to perform:
obtaining service data identifier information of a data record of streaming data, a to-be-processed real-time value of the data record, and a time sequence characteristic of the to-be-processed real-time value of the data record, the service data identifier information representing service data;
obtaining a time sequence characteristic of a processed real-time value of the service data based on a correspondence relationship between the service data identifier information and the time sequence characteristic of the processed real-time value;
comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value;
employing the to-be-processed real-time value of the service data in service computations before the time sequence characteristic of the processed real-time value of the service data has been stored;
using the time sequence characteristic of the to-be-processed value of the service data as the time sequence characteristic of the processed real-time value; and
saving the correspondence relationship between the service data identifier information and the time sequence characteristic of the processed real-time value, wherein:
the service data identifier information comprises: an identifier characteristic and at least one identifier field;
a combination of all identifier fields represents one piece or one set of the service data; and
the identifier characteristic is generated based on a predetermined portion of the combination of all identifier fields.

8. The apparatus according to claim 7, wherein the time sequence characteristic comprises: a real-time value generation time.

9. The apparatus according to claim 7, wherein:
the streaming data comprises: a flow of messages carrying the service data identifier information, the to-be-processed real-time value, and the time sequence characteristic of the to-be-processed real-time value;
the time sequence characteristic of the real-time comprises: a real-time value generation time and a message identifier of a message containing the real-time value, the message identifier reflecting a time sequence of message generation; and
the time sequence of the to-be-processed real-time value being later than the time sequence of the processed real-time comprises: the to-be-processed real-time value's generation time being later than the processed real-time value's generation time, or the generation times of the to-be-processed and processed real-time values being the same and a time sequence reflected by a message identifier of a message containing the to-be-processed real-time value being later than a time sequence reflected by a message identifier of a message containing the processed real-time value.

10. The apparatus according to claim 7, wherein the streaming data distributed processing apparatus runs in parallel and independently on at least two software function modules.

11. The apparatus according to claim 7, wherein:
the at least one identifier field comprises: a main service primary key identifier and an application signature; and
the identifier characteristic is first several bits of a digest value of the main service primary key identifier.

12. The apparatus according to claim 7, wherein the instructions further cause the apparatus to perform:
in response to that the time sequence characteristic of the to-be-processed real-time value is not later than the time sequence characteristic of the processed real-time value, inhibiting the to-be-processed real-time value of the service data to be used in the service computations.

13. A non-transitory computer-readable storage medium storing instructions that, when executed by a processor, cause the processor to perform:
obtaining service data identifier information of a data record of streaming data, a to-be-processed real-time value of the data record, and a time sequence characteristic of the to-be-processed real-time value of the data record, the service data identifier information representing service data;
obtaining a time sequence characteristic of a processed real-time value of the service data based on a correspondence relationship between the service data identifier information and the time sequence characteristic of the processed real-time value;
comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value;
employing the to-be-processed real-time value of the service data in service computations before the time sequence characteristic of the processed real-time value of the service data has been stored;
using the time sequence characteristic of the to-be-processed value of the service data as the time sequence characteristic of the processed real-time value; and saving the correspondence relationship between the service data identifier information and the time sequence characteristic of the processed real-time value, wherein:

the service data identifier information comprises: an identifier characteristic and at least one identifier field;

a combination of all identifier fields represents one piece or one set of the service data; and the identifier characteristic is generated based on a predetermined portion of the combination of all identifier fields.

14. The storage medium according to claim 13, wherein the time sequence characteristic comprises: a real-time value generation time.

15. The storage medium according to claim 13, wherein:

the streaming data comprises: a flow of messages carrying the service data identifier information, the to-be-processed real-time value, and the time sequence characteristic of the to-be-processed real-time value;

the time sequence characteristic of the real-time value comprises: a real-time value generation time and a message identifier of a message containing the real-time value, the message identifier reflecting a time sequence of message generation; and the time sequence of the to-be-processed real-time value being later than the time sequence of the processed real-time value comprises: the to-be-processed real-time value's generation time being later than the processed real-time value's generation time, or the generation times of the to-be-processed and processed real-time values being the same and a time sequence reflected by a message identifier of a message containing the to-be-processed real-time value being later than a time sequence reflected by a message identifier of a message containing the processed real-time value.

16. The storage medium according to claim 13, wherein:

the at least one identifier field comprises: a main service primary key identifier and an application signature; and the identifier characteristic is first several bits of a digest value of the main service primary key identifier.

17. A non-transitory computer-readable storage medium storing instructions that, when executed by a processor, cause the processor to perform:

obtaining service data identifier information of a data record of streaming data, a to-be-processed real-time value of the data record, and a time sequence characteristic of the to-be-processed real-time value of the data record, the service data identifier information representing service data;

obtaining a time sequence characteristic of a processed real-time value of the service data based on a correspondence relationship between the service data identifier information and the time sequence characteristic of the processed real-time value;

comparing the time sequence characteristic of the to-be-processed real-time value and the time sequence characteristic of the processed real-time value, and in response to that the time sequence characteristic of the to-be-processed real-time value is later than the time sequence characteristic of the processed real-time value, updating the time sequence characteristic of the processed real-time value to the time sequence characteristic of the to-be-processed real-time value;

employing the to-be-processed real-time value of the service data in service computations before the time sequence characteristic of the processed real-time value of the service data has been stored;

using the time sequence characteristic of the to-be-processed value of the service data as the time sequence characteristic of the processed real-time value; and saving the correspondence relationship between the service data identifier information and the time sequence characteristic of the processed real-time value, wherein:

the streaming data comprises: a flow of messages carrying the service data identifier information, the to-be-processed real-time value, and the time sequence characteristic of the to-be-processed real-time value;

the time sequence characteristic of the real-time value comprises: a real-time value generation time and a message identifier of a message containing the real-time value, the message identifier reflecting a time sequence of message generation; and the time sequence of the to-be-processed real-time value being later than the time sequence of the processed real-time value comprises: the to-be-processed real-time value's generation time being later than the processed real-time value's generation time, or the generation times of the to-be-processed and processed real-time values being the same and a time sequence reflected by a message identifier of a message containing the to-be-processed real-time value being later than a time sequence reflected by a message identifier of a message containing the processed real-time value.

* * * * *

UNITED STATES PATENT AND TRADEMARK OFFICE
CERTIFICATE OF CORRECTION

PATENT NO.         : 11,036,562 B2
APPLICATION NO.    : 16/195223
DATED              : June 15, 2021
INVENTOR(S)        : Chenglin Feng et al.

It is certified that error appears in the above-identified patent and that said Letters Patent is hereby corrected as shown below:

In the Claims

Claim 2, Column 12, Line 49:
"real time-value" should read -- real-time value --.

Claim 3, Column 12, Line 66:
"to-be processed" should read -- to-be-processed --.

Claim 6, Column 13, Line 18:
"date" should read -- data --.

Claim 9, Column 14, Lines 3-4:
"real-time comprises" should read -- real-time value comprises --.

Claim 9, Column 14, Line 10:
"real-time comprises" should read -- real-time value comprises --.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*